US012807151B2

(12) United States Patent (10) Patent No.: US 12,807,151 B2
Diamond et al. (45) Date of Patent: Nov. 24, 2026

(54) VEHICLE CRUISE CONTROL

(71) Applicant: Ford Global Technologies, LLC, Dearborn, MI (US)

(72) Inventors: Brendan Francis Diamond, Grosse Pointe, MI (US); Jordan Barrett, Milford, MI (US); Keith Weston, Canton, MI (US); Andrew Denis Lewandowski, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 150 days.

(21) Appl. No.: 18/065,647

(22) Filed: Dec. 14, 2022

(65) Prior Publication Data

US 2024/0199012 A1 Jun. 20, 2024

(51) Int. Cl.
*B60W 30/14* (2006.01)
*B60W 50/10* (2012.01)

(52) U.S. Cl.
CPC .......... *B60W 30/143* (2013.01); *B60W 50/10* (2013.01); *B60W 2555/60* (2020.02); *B60W 2556/45* (2020.02)

(58) Field of Classification Search
CPC ......... B60W 40/105; B60W 2420/403; B60W 2420/40; B60W 2420/406; B60W 2420/408; B60W 30/143; B60W 50/10; B60W 2550/60; B60W 2050/0075; B60W 2556/45; G06V 20/58
USPC ...................................................... 701/96, 93
See application file for complete search history.

(56) References Cited

U.S. PATENT DOCUMENTS 6,411,883 B1 * 6/2002 Basten ............... B60K 31/0008 180/169
9,969,392 B2 * 5/2018 Fairgrieve ........... B60W 50/085
10,053,093 B2 8/2018 Thomas
10,144,421 B2 * 12/2018 Fairgrieve ........... B60W 30/182
11,667,285 B2 * 6/2023 Wang ................. B60K 31/0008 701/93
11,981,203 B2 * 5/2024 Barrett ............... B60K 31/0066
(Continued)

FOREIGN PATENT DOCUMENTS

AU 2013303992 A1 * 4/2015 ............. B60K 28/16
CN 110576856 A * 12/2019
(Continued)

OTHER PUBLICATIONS

CN 110576856 A "An Adaptive Cruise State Of The Speed Determining Method, Device And Automobile" by zHU et al (Year: 2019) (Year: 2019).*

(Continued)

*Primary Examiner* — Cuong H Nguyen
(74) *Attorney, Agent, or Firm* — Frank A. MacKenzie; Brooks Kushman P.C.

(57) ABSTRACT

A system and method for operating a cruise control feature of a vehicle may operate by receiving a current speed limit for a roadway on which the vehicle is travelling, determining a first speed based upon the current speed limit, receiving current traffic data for the roadway on which the vehicle is travelling, determining a second speed based upon the current traffic data, and assigning a minimum of the first and second speeds as a set speed for a cruise control feature.

19 Claims, 2 Drawing Sheets

(56) References Cited

U.S. PATENT DOCUMENTS

| | | | | |
|---|---|---|---|---|
| 11,990,034 | B2 * | 5/2024 | Ran | G08G 1/07 |
| 2010/0217494 | A1 | 8/2010 | Heft et al. | |
| 2015/0149059 | A1 * | 5/2015 | Choi | B60W 30/146 701/96 |
| 2015/0253778 | A1 * | 9/2015 | Rothoff | B60W 60/0057 701/25 |
| 2016/0023656 | A1 * | 1/2016 | Matsumura | B60W 30/143 701/93 |
| 2016/0214608 | A1 * | 7/2016 | Packwood-Ace | B60W 30/143 |
| 2021/0347360 | A1 * | 11/2021 | de la Garza Villarreal | B60W 30/146 |
| 2022/0119016 | A1 * | 4/2022 | Rajvanshi | B60W 60/0059 |
| 2022/0242408 | A1 | 8/2022 | Namba | |
| 2023/0264569 | A1 * | 8/2023 | Barrett | B60W 30/14 701/93 |

FOREIGN PATENT DOCUMENTS

| | | | | | |
|---|---|---|---|---|---|
| CN | 112078579 | A | | 12/2020 | |
| CN | 113044030 | A | | 6/2021 | |
| CN | 114771519 | A | | 7/2022 | |
| CN | 118182465 | A | * | 6/2024 | B60W 30/143 |
| EP | 1144217 | B1 | * | 9/2004 | B60K 31/042 |
| GB | 2519533 | A | * | 4/2015 | B60K 31/042 |
| GB | 2520131 | A | * | 5/2015 | B60W 30/14 |
| WO | WO-2015032827 | A2 | * | 3/2015 | B60W 30/14 |
| WO | WO-2015059137 | A1 | * | 4/2015 | B60K 31/042 |
| WO | WO-2017097914 | A1 | * | 6/2017 | B60W 30/146 |
| WO | WO-2018233265 | A1 | * | 12/2018 | B60W 10/18 |
| WO | WO-2022112143 | A1 | * | 6/2022 | B60W 30/16 |

OTHER PUBLICATIONS

Naujoks, Frederik, et al. “Improving usefulness of automated driving by lowering primary task interference through HMI design.” Journal of Advanced Transportation 2017.1 (2017): 6105087. (Year: 2017).*

Gladisch, Christoph, et al. “Experience paper: Search-based testing in automated driving control applications.” 2019 34th IEEE/ACM International Conference on Automated Software Engineering (ASE). IEEE, 2019. (Year: 2019).*

Várhelyi, András, et al. “Driving with and without automation on the motorway-an observational study.” Journal of Intelligent Transportation Systems 25.6 (2021): 587-608. (Year: 2021).*

An NPL version of WO 2015/032827 A2 by Pacwood Ace Elizabeth.*

Chen, Zhigui, et al. “Towards human-like speed control in autonomous vehicles: A mountainous freeway case.” Accident Analysis & Prevention 166 (2022): 106566. (Year: 2022).*

Sahnoon, Iyad. “Effect of Connected Cruise Control Equipped Vehicles on Traffic Operation and Safety.” (2023). (Year: 2023).*

Acerra, Ennia Mariapaola. “1° level of automation: the effectiveness of adaptive cruise control on driving and visual behaviour.” (2023). (Year: 2023).*

Yuan, Chen, et al. “Developing a variable speed limit control strategy for mixed traffic flow based on car-following collision avoidance theory.” Mathematics 10.16 (2022): 2987. (Year: 2022).*

Tomtom, “Intelligent Speed Assistance”, https://www.tomtom.com/use-cases/intelligent-speed-assistance/.

* cited by examiner

VEHICLE CRUISE CONTROL

BACKGROUND

Many vehicles include a "cruise control" feature wherein an operator may set a target speed for vehicle travel. Upon deactivation by the operator, such as by a cancel command or activation of the brakes, the operation of the cruise control may be reactivated with a resume command to resume operation of the vehicle based on the previously set speed.

DETAILED DESCRIPTION

Figure 1:
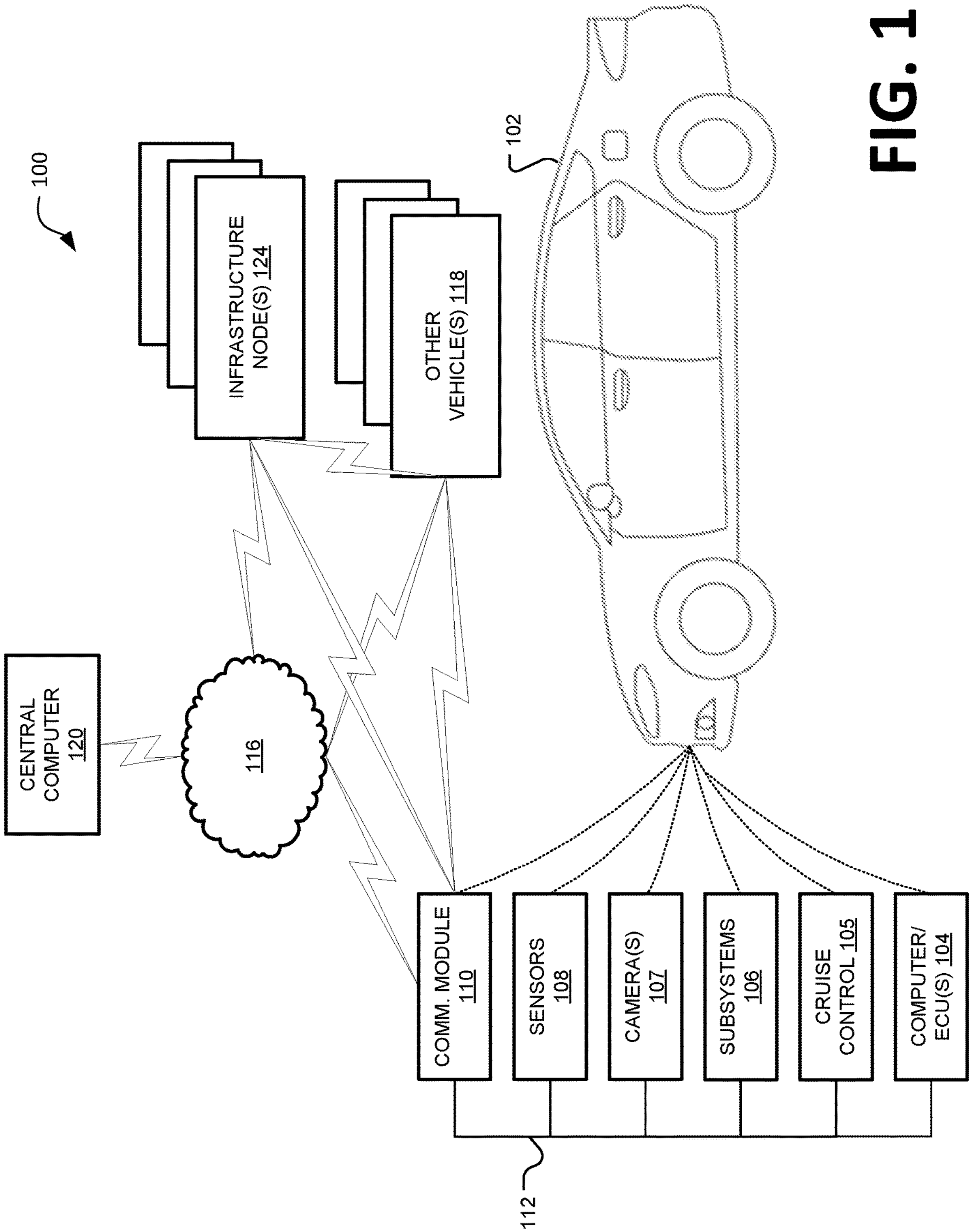
FIG. 1 is a diagram of an example system for assigning a set speed to a cruise control function.

A user may activate a conventional cruise control feature of a vehicle with a "resume" command to have the vehicle actuate elements to maintain the speed of the vehicle according to a "set speed." However, if a user has not defined a set speed during the current ignition cycle or usage cycle, such a resume command may have no effect. Additionally, even if a set speed has been previously defined during the ignition or usage cycle, changed operating conditions may make a different set speed more appropriate when resume command is input.

In accordance with the present disclosure, a set speed for a cruise control function of a vehicle may be determined based upon a prescribed target speed, such as a current speed limit of the roadway that on which the vehicle is travelling, and the current traffic conditions around the vehicle. A processor in the vehicle can determine a first speed, i.e., the prescribed target speed, as a first candidate set speed based upon, for example, the current speed limit adjusted by an offset. The processor can determine a second speed as a second candidate set speed based upon the current traffic data, such as data from other vehicles in a segment of a road also being traveled by the host vehicle, infrastructure that includes infrastructure nodes that receive data from roadside sensors with a field of view including a segment of road, and/or the vehicle's front and rear facing sensors and/or cameras. The other vehicles and/or infrastructure can, for example, provide current vehicle speeds and locations to a central computer, that can then aggregate the data, e.g., determine average speeds of the vehicles. While more localized, the vehicle sensors (e.g., radar, lidar, ultrasonic, V2V/GPS) and/or cameras can collect data on the relative speed of nearby vehicles over a stretch of the roadway, and determine a moving average of the speed of nearby vehicles in a portion of roadway having a particular proscribed speed, resetting each time a speed limit changes.

The first and second candidate set speeds may be compared and the lesser (i.e., minimum) of the first and second candidate set speeds may be assigned as the set speed without requiring any input from the user (other than possibly enabling the feature). Thus, when a user activates the cruise control feature of the vehicle using a resume command, the assigned set speed can operate the vehicle according to an appropriate speed for the roadway.

In one or more implementations of the present disclosure, a computing device of a vehicle may include a processor and a memory, wherein the memory stores instructions executable by the processor such that the computing device is programmed to: receive a current speed limit for a roadway on which the vehicle is travelling; determine a first speed based upon the current speed limit; receive current traffic data for the roadway on which the vehicle is travelling; determine a second speed based upon the current traffic data; and assign a minimum of the first and second speeds as an assigned set speed for a cruise control feature.

In an implementation, the first speed may be determined as the current speed adjusted by a predetermined offset.

In another implementation, the predetermined offset may be a user-selected offset or a learned offset based on user driving data.

In an implementation, the current traffic data may include data from other vehicles on the roadway on which the vehicle is travelling.

In a further implementation, the instructions to receive current traffic data may include instructions to receive traffic data over vehicle-to-vehicle (V2V) and vehicle-to-infrastructure (V2X) communication.

In an implementation, the instructions to receive current traffic data may include instructions to receive exterior sensor data from the vehicle.

In another implementation, the computing device may further include instructions executable by the processor such that the computing device is programmed to determine, prior to determining the first and second speeds, that an assigned set speed feature has been enabled for the cruise control feature of the vehicle.

In an implementation, the computing device may further include instructions executable by the processor such that the computing device is programmed to, prior to determining the first and second speeds, determine that the set speed for the cruise control feature has been defined; and determine that the current speed limit for the roadway on which the vehicle is travelling has changed since the set speed was defined or that a speed indicated by the current traffic data has changed by a predetermined threshold since the set speed was defined.

In another implementation, the computing device may further include instructions executable by the processor such that the computing device is programmed to, after assigning the set speed, receive user input of a new set speed to override the assigned set speed.

In yet another implementation, the computing device may further include instructions executable by the processor such that the computing device is programmed to actuate one or more components of the vehicle to control the cruise control feature based upon the assigned set speed.

In one or more implementations of the present disclosure, a method may include: receiving a current speed limit for a roadway on which a vehicle is travelling; determining a first speed based upon the current speed limit; receiving current traffic data for the roadway on which the vehicle is travelling; determining a second speed based upon the current traffic data; and assigning a minimum of the first and second speeds as an assigned set speed for a cruise control feature.

In an implementation of the method, the first speed may be determined as the current speed limit adjusted by an offset.

In another implementation of the method, the offset may be a user-selected offset or a learned offset based on user driving data.

In a further implementation of the method, the current traffic data may include data from other vehicles on the roadway on which the vehicle is travelling.

In an implementation of the method, receiving current traffic data may include receiving data over vehicle-to-vehicle (V2V) and vehicle-to-infrastructure (V2X) communication.

In an implementation of the method, receiving current traffic data may include receiving exterior sensor data from the vehicle.

In an implementation, the method may further include determining, prior to the determination of the first and second speeds, that an assigned set speed feature has been enabled for the cruise control feature of the vehicle.

In another implementation, the method may further include, prior to the determination of the first and second speeds: determining that the set speed for the cruise control feature has been defined; and determining that the current speed limit for the roadway on which the vehicle is travelling has changed since the set speed was defined or that a speed indicated by the current traffic data has changed by a threshold since the set speed was defined.

In an implementation, the method may further include, after assigning the set speed, receiving user input of a new set speed to override the assigned set speed.

In yet another implementation, the method may further include actuating one or more components of the vehicle to control the cruise control feature based upon the assigned set speed.

With reference to FIG. 1, a connected vehicle system 100 can provide communications between a vehicle 102, one or more other vehicles 118, infrastructure nodes 124, and/or a central computer 120 to share data among the various entities.

Vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including but not limited to a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Cruise control 105 may provide a cruise control feature, which may actuate various subsystems, such as those related to propulsion and braking, so as to control a speed of the vehicle 102. Controls and settings for the cruise control 105 may be provided in various ways, including but not limited to voice activation, controls in the HMI, and/or control buttons or pads on the steering wheel of the vehicle 102. Controls for cruise control 105 may include, for example, controls to turn the cruise control feature on and off, to define a set speed, to cancel operation, to resume operation, to increase speed, and to decrease speed. Cruise control 105 may also include controls for advanced features associated with adaptive or intelligent cruise control such as follow distance, lane centering, lane change, speed sign recognition, and the like. Further, in accordance with the present disclosure, cruise control 105 may include a control or setting to enable or disable the assignment of a set speed (i.e., an "assign set speed" feature).

Computers, including the herein-discussed one or more vehicle computers or electronic control units (ECUs) 104 (sometimes referred to herein as vehicle computer 104), processors in other vehicles 118, infrastructure nodes 124, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more computers/ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more computers/ECUs 104 can be included in a vehicle 102 that may be any suitable type of ground vehicle 102, e.g., a passenger or commercial automobile such as a sedan, a coupe, a truck, a sport utility, a crossover, a van, a minivan, etc. As part of an autonomous vehicle (AV) system, computer/ECU 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations, such as by sending vehicle data over the vehicle network 112. Additionally, a computer/ECU 104 may be programmed to determine whether and when a human operator is to control such operations.

A vehicle computer 104 may include or be communicatively coupled to, e.g., via a vehicle network 112 such as a communications bus as described further below, more than one processor, e.g., included in sensors 108, cameras 107, electronic controller units (ECUs) 104 or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

A vehicle 102 in accordance with the present disclosure includes a plurality of sensors 108 that may support the AV and cruise control features. For example, sensors 108 may include, but are not limited to, one or more wheel speed sensors, GPS sensor, ultrasonic parking sensor, short range RADAR, medium range RADAR, LiDAR, light sensor, rain sensor, accelerometer, etc. Sensors 108 may also include those under control of a body control module (BCM), such as accelerometers, seatbelt sensors, airbag deployment sensors, and the like.

A vehicle 102 in accordance with the present disclosure includes one or more cameras 107 that may support the AV and cruise control features. For example, the camera(s) 107 may include one or more exterior cameras, including one or more forward-facing camera that may image the traffic in front of vehicle 102, one or more rear-ward facing camera that may image the traffic behind the vehicle 102, and/or one or more side-facing camera that may image the traffic next to vehicle 102.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, cameras, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, other vehicles 118, infrastructure such as infrastructure nodes 124 that receive data from and/or include roadside unit/sensors, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or other vehicles 118, and/or infrastructure nodes 124, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure node 124 typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

Roadside or traffic infrastructure can include a plurality, and typically many, infrastructure nodes 124 to assist operation, e.g., provide navigation and/or path planning support, to one or more vehicles 102, 118. An infrastructure node 124 can have mounted or fixed thereto one or more sensors (not shown) and can include a communications module (not shown) to provide V2X communications or the like, and/or communications via a wide area network 116, thereby facilitating communications with vehicles 102, 118 and/or central computer 120. The infrastructure node 124 also can includes a node computer (not shown) that can receive and process data from one or more of the sensors, and initiate communications via the communications module. An infrastructure node 124 typically includes a physical structure such as a tower or other support structure (e.g., a pole, a box mountable to a bridge support, cell phone tower, road sign support, etc.) on which infrastructure sensors, as well as an infrastructure communications module and computer can be mounted, stored, and/or contained, and powered, etc. The infrastructure node 124 is typically stationary, i.e., fixed to and not able to move from a specific geographic location. The infrastructure sensors may include one or more sensors such as described above for the vehicle sensors 108, e.g., LIDAR, radar, cameras, ultrasonic sensors, etc. The infrastructure node 124 communications module and computer typically have features in common with the vehicle computers 104 and vehicle communications module 110, and therefore will not be described further to avoid redundancy. The infrastructure node 124 typically also includes a power source such as a battery, solar power cells, and/or a connection to a power grid.

The other vehicles 118 and infrastructure nodes 124 may use any suitable wireless communications, such as cellular or WI-FI, such as to communicate with the central computer 120 via the wide area network 116.

Whether direct, such as via V2V, V2X, C-V2X, or DSRC, or indirect via wide area network 116, traffic data 224 (see FIG. 2) may be received by communication module 110 related to the density and average speed of nearby vehicles on the roadway that vehicle 102 is travelling on. Traffic data 224 may also be received from sensors 108 and camera(s) 107. A speed limit 222 (see FIG. 2) for the roadway on which vehicle 102 is travelling may be provided from a forward-facing camera 107 and a speed sign recognition module, from map data stored in computer 104, from an infrastructure node 124, and/or from central computer 120 over wide area network 116.

Figure 2:
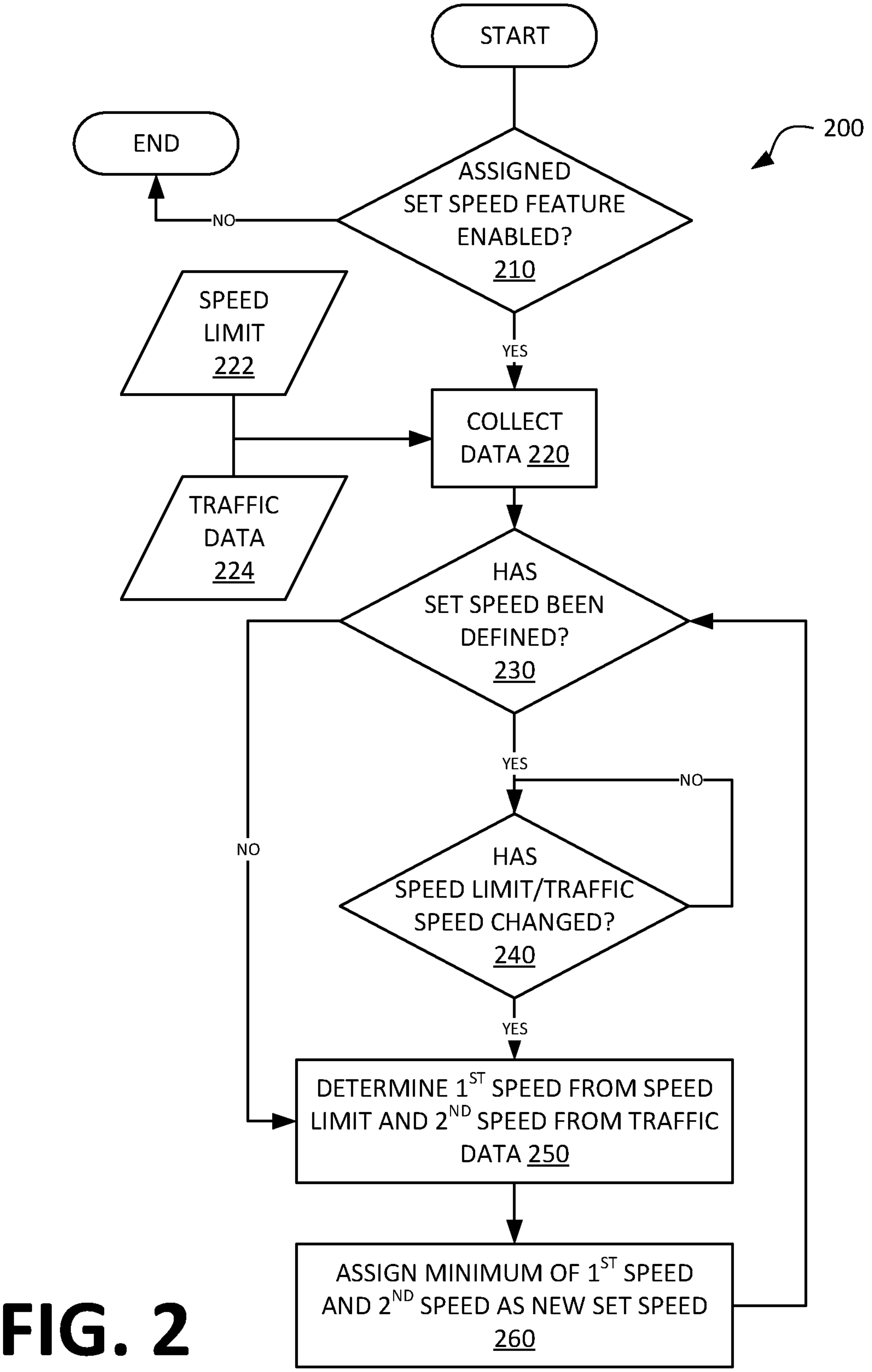
FIG. 2 is a diagram of an example process flow for assigning a set speed to a cruise control function.

With reference to FIG. 2, a process flow 200 for assigning a set speed to a cruise control feature is illustrated. The process flow 200 may start when the cruise control feature is activated by a user. Alternately, the process flow 200 may start after the vehicle has been started and reached a predetermined speed at which the cruise control feature is capable of operating, with the process flow 200 operating in the background prior to the cruise control feature being activated so that an assigned set speed is available immediately upon activation.

In a first decision block 210, a computer 104 may determine if an assigned set speed feature of the cruise control feature has been enabled. If the assigned set speed feature of the cruise control feature has not been enabled ("NO"), the computer 104 can end the method. If the assigned set speed feature of the cruise control feature has been enabled ("YES"), the computer 104 can proceed with the method in block 220.

In block 220, the computer 104 collects data, including input of the currently applicable speed limit 222 and traffic data 224. The speed limit 222 may come, for example, from map data corresponding to a current GPS location, from a speed sign recognition module based on forward-facing camera data from the vehicle 102, or from nearby infrastructure nodes 124. Input of the traffic data 224 to computer 104 may come, for example, from nearby vehicle(s) 118 and infrastructure node(s) 124 via V2V, V2X, C-V2X, or DSRC communication, or indirectly via wide area network 116 using communication module 110. For example, a central computer 120 could receive speeds of vehicles in a segment of a roadway detected by roadside sensors, and could then provide an average speed of the vehicles as traffic data 224 to a vehicle 102. The traffic data 224 may include, for example, data specifying a traffic density i.e., a number of vehicles per unit of distance, e.g., a number of vehicles per mile, quarter mile, etc., in addition to or alternatively to the average speed of nearby vehicles on the roadway that vehicle 102 is travelling on.

Next, in a decision block 230, the computer 104 may determine if a set speed for the cruise control feature has been defined. A set speed may be defined by the user during prior operation of the cruise control feature (e.g., by a set speed command), or may be defined by the computer 104 based upon the assigned set speed feature, as described below.

If a set speed for the cruise control feature has been defined ("YES") at decision block 230, the process flow 200 moves to decision block 240, in which the computer 104 determines whether conditions have changed since the set speed was defined, i.e., whether the speed limit 222 has changed since the set speed was defined, or whether the traffic speed has changed by a threshold amount since the set speed was defined based upon the current traffic data 224. The traffic speed may be estimated based upon an average speed of nearby vehicles, and a threshold for the change in the average speed of nearby vehicles on the roadway may be set, for example, at 10 mph, 15 mph, or 20 mph, and may change based upon the corresponding speed limit.

In an implementation, the traffic speed may include both the speed of the host vehicle 102 and the speed of other vehicles 118 from traffic data 224, and calculations may use a time-weighted moving average over a recent period (e.g., the last 50-100 seconds) for periodic comparison to the defined set speed to determine if the traffic speed has changed by more than the threshold. Implementations may also include filtering to address highly transient changes in speed due to causes such as a traffic light or a road hazard, so that such changes do not result in a spurious assigned set speed.

If the speed limit 222 has not changed and the traffic speed has not changed by the threshold amount ("NO") at decision block 240, the computer 104 periodically loops back and continues to check for these changes.

If (i) a set speed for the cruise control feature has not been determined ("NO") at decision block 230, or (ii) the speed limit 222 has been determined to have changed or the traffic speed has changed by a preset threshold amount ("YES") at decision block 240, the process flow 200 moves to block 250, in which the computer 104 determines a first candidate set speed based upon the speed limit 222 and determines a second candidate set speed based upon the traffic data 224, such as the average speed of nearby vehicles on the roadway.

The first candidate set speed may be, for example, the (current) speed limit 222 or the (current) speed limit 222 adjusted by an offset. The offset may be a value stored in a memory of a computer 104, may be user-defined (such as by user input), and/or may vary as a percentage of the speed limit (e.g., the first candidate set speed could be 90% or 95% of a determined speed limit), and/or may be learned, such as based upon machine learning from driving data of the user, but is not limited to these.

With respect to an implementation using a learned offset, a suitable machine learning (ML) program such as a deep neural network (DNN) may be trained and then used to output the offset. A DNN can be a software program that can be loaded in memory and executed by a processor included in a computer, such as vehicle computer 104 or central computer 120 for example. In an example implementation, the DNN can include, but is not limited to, a convolutional neural network CNN, R-CNN Region-based CNN, Fast R-CNN, and Faster R-CNN. The DNN includes multiple nodes or neurons. The neurons are arranged so that the DNN includes an input layer, one or more hidden layers, and an output layer. The input and output layers may also include more than one node.

As one example, the DNN can be trained with ground truth data, i.e., data about a real-world condition or state. For example, the DNN can be trained with ground truth data and/or updated with additional data. Weights can be initialized by using a Gaussian distribution, for example, and a bias for each node can be set to zero. Training the DNN can include updating weights and biases via suitable techniques such as back-propagation with optimizations. Ground truth data means data deemed to represent a real-world environment, e.g., conditions and/or objects in the environment. Thus, ground truth data can include sensor data depicting an environment, e.g., a speed, location, etc., along with a label or labels describing the environment, e.g., a label describing the data, e.g., as a user-defined set speed, a current speed limit, or an average speed of traffic.

In the present context, ground truth data used to train a DNN could include vehicle operating data from the identified operator related to user-defined set speeds and associated proscribed speeds or speed limits. That is, selected set speeds and offsets from a user, along with associated speed limits or the like, could be provided to train the DNN. Then, the DNN could be included in a vehicle computer 104 to output an offset upon input of a current speed limit and a selected set speed. As mentioned below, data used to train a DNN and data input to a DNN to determine an offset could also include a traffic density associated with selected set speeds and offsets.

In another implementation, a learned offset may be a moving average of a difference between a user-defined set speed and a speed limit of the roadway at the time the user defined the set speed. For example, the offset could be set as an average offset over the last ten times the user defined a set speed.

The second candidate set speed may be, for example, the average speed of nearby vehicles on the roadway or the average speed of nearby vehicles on the roadway adjusted by an offset as discussed with respect to the first candidate set speed. In an implementation, both the speed and the density of vehicular traffic in the traffic data 224 may be used as input to a DNN so as to take traffic density into account in determination of the second candidate set speed, wherein, for example, a higher traffic density may result in a lower second candidate set speed. In another implementation, the traffic data 224 may be used to determine an average speed and an actual traffic density in vehicles/mile/lane. If the actual traffic density is greater than, for example, 50 vehicles/mile/lane, a gain, for example, −0.1 is applied to lower the second candidate set speed by 10%.

At block 260, the computer 104 compares the values of the first and second candidate set speeds from block 240, and assigns the lesser (i.e., minimum) of the two values as the new set speed, and returns to block 220 (or block 230) to continue the process flow 200 until the user completes the trip or deactivates the cruise control feature.

While the term "speed limit" has been used in the description above as the posted speed limit as determined by signage, the term may apply to any proscribed or prescribed speed and, for example, map data available to computer 104 may apply proscribed speeds other than the posted speed limit as determined by signage without departing from the present disclosure.

While disclosed above with respect to certain implementations, various other implementations are possible without departing from the current disclosure. For example, in another implementation, if an assigned set speed has replaced a user-defined set speed based upon changed conditions of a change in speed limit, and the speed limit has returned to the speed limit when the user defined the set speed, the set speed may be returned to the user-defined set speed.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein.

Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computing device of a vehicle including a processor and a memory, wherein the memory stores instructions executable by the processor such that the computing device is programmed to:
- receive a predetermined speed limit, from signage, map data, and/or an infrastructure node, for a roadway on which the vehicle is travelling;
- determine a speed-limit-based candidate set speed based upon the predetermined speed limit;
- receive current traffic data including data about a plurality of other vehicles travelling on the roadway on which the vehicle is travelling;
- determine a traffic-based candidate set speed based upon the current traffic data;
- compare the speed-limit-based candidate set speed to the traffic-based candidate set speed to determine a lesser of the speed-limit-based candidate set speed and the traffic-based candidate set speed; and
- assign the lesser of the speed-limit-based candidate set speed and the traffic-based candidate set speed as an assigned set speed for a cruise control feature.

2. The computing device of claim 1, wherein the speed-limit-based candidate set speed is determined as the predetermined speed limit adjusted by a predetermined offset.

3. The computing device of claim 2, wherein the predetermined offset is a user-selected offset or a learned offset based on user driving data.

4. The computing device of claim 1, wherein the current traffic data comprises data from other vehicles on the roadway on which the vehicle is travelling and/or is received over vehicle-to-vehicle (V2V) and/or vehicle-to-infrastructure (V2X) communication.

5. The computing device of claim 1, wherein determining the traffic-based candidate set speed includes:
- determining a moving average of speeds of the plurality of other vehicles over a predetermined time period; and
- resetting the moving average each time the predetermined speed limit changes.

6. The computing device of claim 4, wherein the instructions to receive current traffic data include instructions to receive exterior sensor data from the vehicle.

7. The computing device of claim 1, wherein the current traffic data includes data specifying a traffic density that is a number of vehicles per unit of distance or data specifying an average speed of the other vehicles.

8. The computing device of claim 1, further comprising instructions executable by the processor such that the computing device is programmed to, prior to determining the speed-limit-based candidate set speed and traffic-based candidate set speed:
- determine that a speed indicated by the current traffic data has changed by a predetermined threshold.

9. The computing device of claim 1, further comprising instructions executable by the processor such that the computing device is programmed to, after assigning the set speed:

receive user input of a new set speed to override the assigned set speed.

10. The computing device of claim 1, further comprising instructions executable by the processor such that the computing device is programmed to:

actuate one or more components of the vehicle to control the cruise control feature based upon the assigned set speed.

11. A method, comprising:

receiving a predetermined speed limit, from signage, map data, and/or an infrastructure node, for a roadway on which a vehicle is travelling;

determining a speed-limit-based candidate set speed based upon the predetermined speed limit;

receiving current traffic data including data about a plurality of other vehicles travelling on the roadway on which the vehicle is travelling;

determining a traffic-based candidate set speed based upon the current traffic data;

comparing the speed-limit-based candidate set speed to the traffic-based candidate set speed to determine a lesser of the speed-limit-based candidate set speed and traffic-based candidate set speed; and assigning the lesser of the speed-limit-based candidate set speed and the traffic-based candidate set speed as an assigned set speed for a cruise control feature.

12. The method of claim 11, wherein the speed-limit-based candidate set speed is determined as the predetermined speed limit adjusted by an offset.

13. The method of claim 12, wherein the offset is a user-selected offset or a learned offset based on user driving data.

14. The method of claim 11, wherein the current traffic data comprises data from other vehicles on the roadway on which the vehicle is travelling and/or is received over vehicle-to-vehicle (V2V) and/or vehicle-to-infrastructure (V2X) communication.

15. The method of claim 11, wherein determining the traffic-based candidate set speed includes:

determining a moving average of speeds of the plurality of other vehicles over a predetermined time period; and resetting the moving average each time the predetermined speed limit changes.

16. The method of claim 14, wherein receiving current traffic data includes receiving exterior sensor data from the vehicle.

17. The method of claim 11, further comprising actuating one or more components of the vehicle to control the cruise control feature based upon the assigned set speed.

18. The method of claim 11, further comprising, prior to the determination of the speed-limit-based candidate set speed and traffic-based candidate set speed:

determining that a speed indicated by the current traffic data has changed by a threshold.

19. The method of claim 11, further comprising, after assigning the set speed, receiving user input of a new set speed to override the assigned set speed.

* * * * *